United States Patent
Noh et al.

(10) Patent No.: US 12,106,018 B2
(45) Date of Patent: Oct. 1, 2024

(54) METHOD AND APPARATUS FOR GENERATING MOTION OF OBJECT

(71) Applicant: KOREA ADVANCED INSTITUTE OF SCIENCE AND TECHNOLOGY, Daejeon (KR)

(72) Inventors: Junyong Noh, Daejeon (KR); Seokpyo Hong, Daejeon (KR); Daseong Han, Gyeongsangbuk-do (KR); Kyungmin Cho, Daejeon (KR); Sung Yong Shin, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1112 days.

(21) Appl. No.: 16/898,710

(22) Filed: Jun. 11, 2020

(65) Prior Publication Data

US 2021/0248287 A1 Aug. 12, 2021

(30) Foreign Application Priority Data

Feb. 10, 2020 (KR) .................. 10-2020-0015776

(51) Int. Cl.
G06F 30/20 (2020.01)
G06F 111/04 (2020.01)
G06T 7/20 (2017.01)

(52) U.S. Cl.
CPC .............. *G06F 30/20* (2020.01); *G06T 7/20* (2013.01); *G06F 2111/04* (2020.01); *G06T 2207/30241* (2013.01)

(58) Field of Classification Search
CPC ........ G06F 30/20; G06F 2111/04; G06T 7/20; G06T 2207/30241
See application file for complete search history.

(56) References Cited

PUBLICATIONS

Ha, S., & Liu, C. K. (May 2016). Evolutionary optimization for parameterized whole-body dynamic motor skills. In 2016 IEEE International Conference on Robotics and Automation (ICRA) (pp. 1390-1397). IEEE. (Year: 2016).*
Peng, X. B., Berseth, G., Yin, K., & Van De Panne, M. (2017). Deeploco: Dynamic locomotion skills using hierarchical deep reinforcement learning. ACM Transactions on Graphics (TOG), 36(4), 1-13. (Year: 2017).*
Hong, S. et al. "Physics-based Full-body Soccer Motion Control for Dribbling and Shooting(R1)", Korea Computer Graphics Society, http://www.dbpia.co.kr/journal/articleDetail?nodeId= NODE09221641, Jul. 2019.

(Continued)

*Primary Examiner* — Bijan Mapar
(74) *Attorney, Agent, or Firm* — Meunier Carlin & Curfman LLC

(57) ABSTRACT

A method of simulating a motion of an object controlling another object based on an example motion or a previously generated motion of the object is disclosed. The method includes refining a motion of a first object based on a motion of the first object predicted based on a motion specification, and on a trajectory of a second object controlled by the first object, and simulating the motion of the first object and the trajectory of the second object based on a vector for controlling joints of the first object that is generated based on the refined motion.

20 Claims, 8 Drawing Sheets

Tackling

(56) References Cited

PUBLICATIONS

Hong, S., et al. "Physics-based Full-body Soccer Motion Control for Dribbling and Shooting(R2)", ACm Trans.Grap., vol. 38, No. 4, Article 74, Jul. 2019.

Libin Liu, "Learning Basketball Dribbling Skills Using Trajectory Optimization and Deep Reinforcement Learning," ACM Transactions on Graphics, vol. 37, No. 4, Article 142, Aug. 2018.

* cited by examiner

Foot coordinate system $^Fb = (^Fb_x, ^Fb_y, ^Fb_z)$

Relative ball position

Side view

Front view

Pushing

Tackling

METHOD AND APPARATUS FOR GENERATING MOTION OF OBJECT

CROSS-REFERENCE TO RELATED APPLICATION(S)

This application claims the priority benefit of Korean Patent Application No. 10-2020-0015776 filed on Feb. 10, 2020, in the Korean Intellectual Property Office, the disclosure of which is incorporated herein by reference for all purposes.

BACKGROUND

1. Field

One or more example embodiments relate to a method and apparatus for generating and simulating a motion of an object.

2. Description of Related Art

Computer graphics (CG) is a technology for generating images using a computer. It may generate images by converting an outer shape and color of a model to numerals and representing them digitally. With the development of CG and related technologies, a digital video producing technology that represents a movement of an object as more lively or animated images has been more widely used in various fields of industry including, for example, game and animation. To generate an animated CG video, various methods including, for example, a modeling method of simulating a motion of an object in accordance with physical laws and a modeling method of applying a pattern of an interaction with another object in a three-dimensional (3D) space, are under development.

SUMMARY

An aspect provides a technology for generating and simulating a motion of a first object controlling a second object based on a motion specification.

Another aspect provides a technology for generating and simulating a new motion based on an already simulated motion of a first object and a trajectory of a second object.

According to an example embodiment, there is provided a method of generating a motion of an object, the method including predicting a motion of a first object based on a motion specification, refining a motion of the first object based on the predicted motion and a trajectory of a second object controlled by the first object, generating a vector controlling joints of the first object based on the refined motion, and simulating a motion of the first object and the trajectory of the second object based on the generated vector.

The predicting of the motion of the first object may include predicting a motion of the first object in a current iteration based on a motion of the first object simulated in a previous iteration.

The trajectory of the second object may include a trajectory of the second object simulated in the previous iteration.

The generating of the vector may include generating a plurality of windows based on a plurality of states included in the refined motion, and generating a vector for each of the windows based on states of the first object included in a corresponding window and positions of the second object included in the corresponding window.

The predicting of the motion of the first object may include predicting a motion of the first object in the current iteration based on an example motion corresponding to the motion specification among example motions stored in advance in a database (DB).

The predicting of the motion of the first object may include selecting a first reference state from among a plurality of reference states included in the example motion based on a first cost function based on the motion specification and a first state of the first object, and determining a subsequent state of the first state based on whether the first reference state is included in a predefined kick motion.

When the first reference state is included in the predefined motion, the determining of the subsequent state of the first state may include determining a subsequent state of the first reference state in the predefined motion to be the subsequent state of the first state.

When the first reference state is not included in the predefined motion, the determining of the subsequent state of the first state may include determining the subsequent state of the first state based on the first state, the first reference state, and the subsequent state of the first reference state.

The refining of the motion of the first object may include refining a state of the first object in a kick frame corresponding to a state of the first object in which a kick pose is taken, based on a position of the second object in the kick frame.

The generating of the vector may include generating a control policy based on a second cost function based on the refined motion of the first object and the trajectory of the second object, and on a constraint associated with the joints of the first object, in a dynamic system including the first object and the second object, and generating the vector based on the generated control policy.

The generating of the control policy may include determining the control policy such that the second cost function is less than a preset threshold value while satisfying the constraint. The control policy may include a target state vector corresponding to the motion of the first object and the trajectory of the second object, a target control vector corresponding to joint torques of the first object, and a target feedback gain indicating a ratio between the target state vector and the target control vector.

The simulating may include simulating the motion of the first object and the trajectory of the second object based on the vector and an external force.

The motion of the first object may include a plurality of states of the first object corresponding to a plurality of frames. At least one of the frames may be a kick frame corresponding to a state of the first object in which a kick pose is taken.

Each of states included in the motion of the first object may include positions of the joints of the first object corresponding to a corresponding frame, rotation values of the joints, displacements of the positions, and displacements of the rotation values.

The motion specification may include a motion type, a motion velocity, and a motion angle.

The first object may include a human being playing soccer, the second object may include a soccer ball, and the motion type may include forward dribbling, side dribbling and shooting.

According to another example embodiment, there is provided an apparatus for generating a motion of an object, the apparatus including at least one processor configured to refine a motion of a first object based on a motion of the first object predicted based on a motion specification and a trajectory of a second object controlled by the first object, and simulate a motion of the first object and the trajectory of the second object based on a vector controlling joints of the first object based on the refined motion.

The processor may predict a motion of the first object in a current iteration based on a motion of the first object simulated in a previous iteration.

The trajectory of the second object may include a trajectory of the second object simulated in the previous iteration.

The processor may generate a plurality of windows based on a plurality of states included in the refined motion, and generate a vector for each of the windows based on states of the first object included in a corresponding window and positions of the second object included in the corresponding window.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
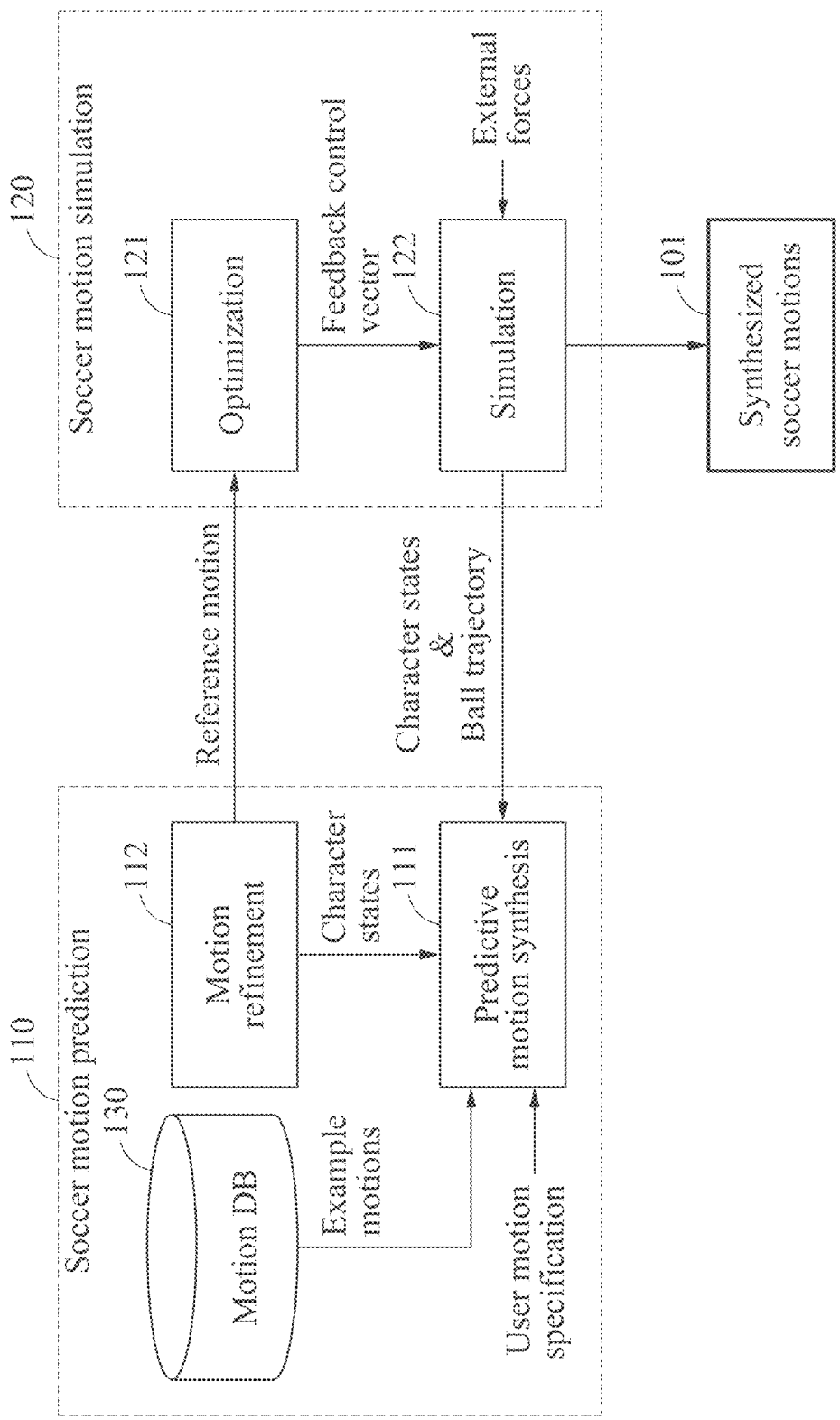
FIG. 1 illustrates an example of a system for generating a simulated motion of a first object controlling a second object according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

In addition, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an example of a system for generating a simulated motion of a first object controlling a second object according to an example embodiment.

Hereinafter, a motion to be generated in a system according to example embodiments described herein will be described as a soccer motion, a first object will be described as a character performing the soccer motion, and a second object will be described as a ball, for example, a soccer ball. However, the motion, the first object, and the second object are not limited to the foregoing examples.

Hereinafter, $^-[\ ]$ may indicate $\overset{-}{[]}$, $^\wedge[\ ]$ may indicate $\overset{\wedge}{[]}$, $^\circ[\ ]$ may indicate $\overset{\circ}{[]}$, and $^\vee[\ ]$ may denote $\overset{\vee}{[]}$.

Referring to FIG. 1, a motion generating system (hereinafter simply "system") includes a motion predicting component 110 and a motion simulating component 120. The motion predicting component 110 and the motion simulating component 120 may operate in cooperation with each other through a feedback loop to generate a simulated soccer motion. Operations to be performed in the system include a motion predicting operation 111, a motion refining operation 112, a simulation-based motion changing operation 121, and a motion simulating operation 122. Such a series of the operations described in the foregoing may form the feedback loop. In addition, a finally simulated motion generating operation 101 may be performed after at least one iteration of the feedback loop.

The motion predicting component 110 may perform the motion predicting operation 111 to predict a motion including a kick pose from example motions stored in a motion database (DB) 130 and a user motion specification. The predicted motion may be refined through the motion refining operation 112 of the system such that positions of foot joints involved with the kick pose are positioned on or around a ball. The foot joints involved with the kick pose may include a left foot joint and a right foot joint. Hereinafter, a foot joint kicking the ball among the foot joints involved with the kick pose will be referred to as a kick foot or a swing foot for the convenience of description, and another foot joint supporting the kick foot or the swing foot will be referred to as a support foot for the convenience of description.

The motion simulating component 120 may generate a feedback control vector to be used to simulate a full-body motion based on a trajectory of the ball. The motion simulated by the feedback control vector may be fed back to the motion predicting component 110 for predicting a subsequent reference motion.

The motion predicting operation 111 may include an operation of generating a reference motion. Herein, a reference motion M may include character states corresponding to a plurality of frames and be represented as $M=\{C^i|i=1, 2, \ldots, N_p\}$, in which $N_p$ denotes a size of the reference motion M, for example, the number of frames corresponding to the reference motion M, and $C^i$ denotes a character state corresponding to an ith frame. The term "character state" used herein may indicate a state of a character performing a motion. The character state $C^i$ corresponding to the ith frame may include a pose $Q^i$ and a displacement $D^i$ of a character that are included in the ith frame, and be represented as $C^i=(Q^i, D^i)$.

The pose $Q^i$ included in the character state $C^i$ corresponding to the ith frame may include a position of a root of the character and rotation values (e.g., quaternion) of joints of the character, and be represented as $Q^i=(p^i_0, q^i_0, q^i_1, \ldots, q^i_{NJ-1})$. Herein, $p^i_0 \in R^3$ denotes the position of the root, and $q^i_0 \in S^3$ denotes a rotation value of the root, and $q^i_j \in S^3$ denotes a rotation value of a joint j ($j=1, 2, \ldots, N_j-1$, in which $N_j$ denotes the number of the joints of the character). The root described herein may indicate a reference joint, for example, a lower portion of a waist or a pelvis of a human being, among a plurality of joints included in the character. The joint j may indicate one the joints included in the character, excluding the root. The position and the rotation value of the joint j may be determined based on the root.

The displacement $D^i$ included in the character state $C^i$ corresponding to the ith frame may include a displacement of the position of the root included in the character and displacements of the rotation values of the joints included in the character, and be represented as $D^i=(\Delta p^i_0, \Delta q^i_0, \Delta q^i_1, \ldots, \Delta q^i_{NJ-1})$. Herein, $\Delta p^i_0 \in R^3$ denotes the displacement of the position of the root, $\Delta q^i_0 \in S^3$ denotes a displacement of the rotation value of the root, and $\Delta q^i_j \in S^3$ denotes a displacement of the rotation value of the joint j. Herein, $\Delta p^i_0$ denotes a difference between the position of the root of the character corresponding to the ith frame and a position of the root of the character corresponding to an i+1th frame. In addition, the displacement of the rotation value may indicate a difference between the rotation value of the joint j of the character corresponding to the ith frame and a rotation value of the joint j of the character corresponding to the i+1 frame.

A rotation value $q^i_j$ of a joint included in a character state may indicate an angle between bones connected by the joint. In addition, a displacement $\Delta q^i_0$ of a rotation value of a joint included in a character state may indicate a difference between a rotation value of the joint included in a character state corresponding to a current frame (e.g., ith frame) and a rotation value of the joint included in a character state corresponding to a subsequent frame (e.g., i+1th frame).

Figure 5:
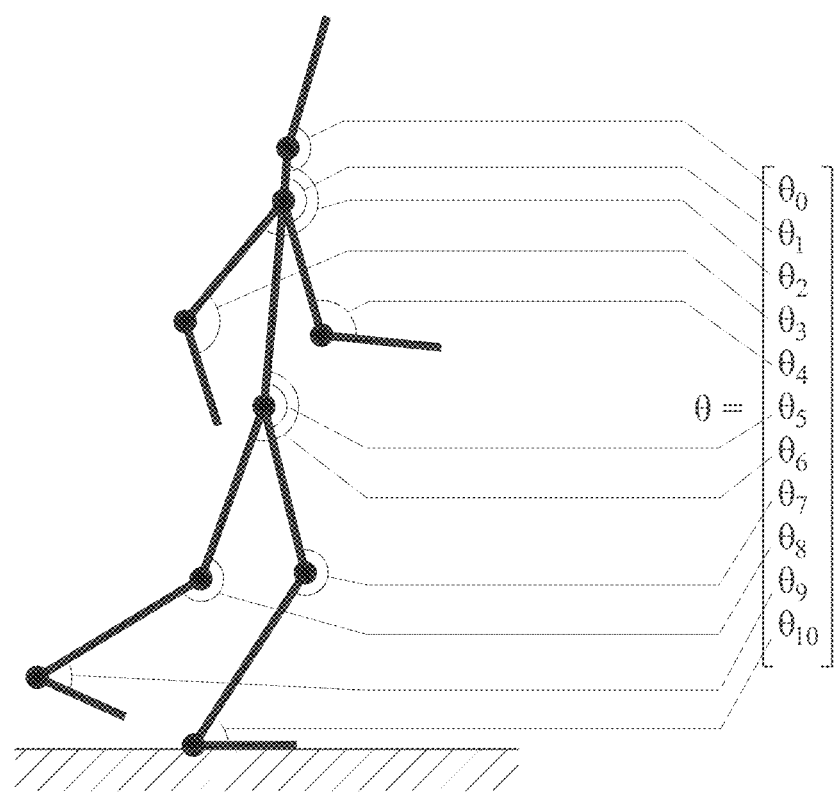
FIG. 5 illustrates an example of joints of a character and a rotation value of each of the joints according to an example embodiment.

For example, referring to FIG. 5, joints included in a character may correspond to points illustrated in FIG. 5, and a rotation value $q^i_j$ of each of the joints included in a state of the character may indicate an angle formed between bones connected by each of the joints. In addition, $\theta_j$ illustrated in FIG. 5 may indicate $q^i_j$, in which $j=1, 2, \ldots$, and 10.

A reference motion M may include at least one kick frame. The kick frame may refer to a frame corresponding to a state of a character taking a kick pose. The kick pose may be a motion of kicking a ball.

A trajectory of the ball, or a ball trajectory B, may include a position of the ball corresponding to each frame. The ball trajectory B may be represented as $B=\{B^i|i=1, 2, \ldots, N_b\}$. Herein, $B^i \in R^3$ may indicate a position of the ball corresponding to an ith frame, and $N_b$ denotes a size of B, for example, the number of frames corresponding to B.

When a motion specification is input or a current reference motion is all used up, or there is an unexpected external force of a great magnitude, the system may perform an operation of generating a new reference motion.

Figure 2:
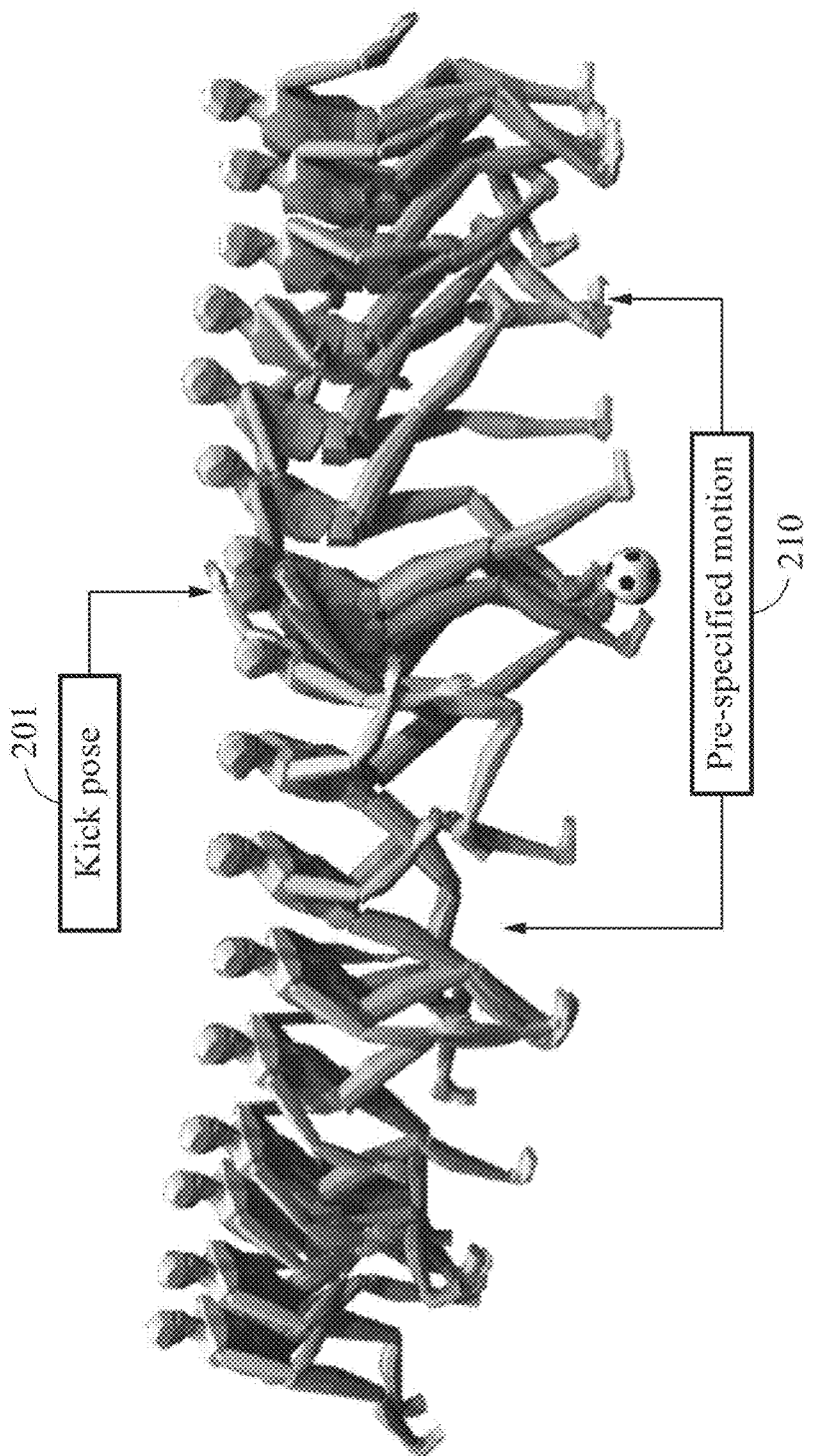
FIG. 2 illustrates an example of a state of a character corresponding to each frame according to an example embodiment.

Before generating a motion, a preprocessing process may be performed on motion clips stored in the DB 130. For example, the preprocessing process may include classifying the motion clips stored in the DB 130 into three motion groups based on a motion type, displaying a kick frame included in the motion clips, and storing, as a predefined kick motion, motion sub-clips including the kick frame and a preset number of frames positioned before and behind the kick frame. Referring to FIG. 2, each illustrated shape of a character may be a shape representing a state of the character corresponding to each frame. For example, motion sub-clips 210 including a kick frame corresponding to a character shape 201 taking a kick pose and a preset number of frames positioned before and behind the kick frame may be stored as a predefined kick motion in the DB 130. A rotation angle of the character in a plurality of frames included in each motion clip may then be displayed. For example, $G=\{g_{fwd}, g_{side}, g_{shoot}\}$, which may indicate a set of motion groups corresponding to a certain motion type. In addition, $^-K=\{^-Q_k|k=1, 2, \ldots, N_k\}$, which may indicate a set of kick poses included in motion clips. Herein, $g_{fwd}$ denotes a motion type indicating forward dribbling, $g_{side}$ denotes a motion type indicating side dribbling, and $g_{shoot}$ denotes a motion type indicating shooting. In addition, $^-Q_k$ denotes a kick pose, and $N_k$ denotes the number of kick poses included in motion clips.

According to an example embodiment, the system may generate a reference motion based on a motion specification, for example, $U=\{t, v, \theta\}$. Herein, $t \in \{fwd, side, shoot\}$ indicates a motion type, v denotes a target velocity, and $\theta$ denotes a target rotation angle. The motion type t may be used to determine a motion group including motion clips to be used to generate a reference motion.

According to an example embodiment, based on an input motion specification and a character state $C^i=(Q^i, D^i)$ in a current frame i of a reference motion, a character state $^-C^p=(^-Q^p, ^-D^p)$ may be selected from motion clips included in a motion group corresponding to a motion type. Herein, p denotes an index of a frame corresponding to a character state selected from motion clips, and the selected character state $^-C^p$ may indicate a character state that minimizes a first cost function among all character states $\bar{C}^j=(\bar{Q}^j, \bar{D}^j)$ included in the motion group. The first cost function will be described hereinafter.

According to an example embodiment, based on whether $\bar{C}^p$ is included in a predefined kick motion, a character state $C^{i+1}$ corresponding to a subsequent frame i+1 of a character state $C^i$ corresponding to a current frame i may be determined. A subsequent state may indicate a character state corresponding to a subsequent frame of a current frame. For example, when $\bar{C}^p$ is included in the predefined kick motion, the system may determine a subsequent state of $\bar{C}^p$ included in the predefined kick motion to be a subsequent state of a reference motion. In contrast, when $\bar{C}^p$ is not included in the predefined kick motion, the system may generate a subsequent state $C^{i+1}=(Q^{i+1}, D^{i+1})$ of $C^i$ based on $C^i$, $\bar{C}^p$, and a subsequent state $\bar{C}^{p+1}$ of $\bar{C}^p$. In this example, to determine $C^{i+1}$, $\hat{C}^{i+1}$ may be calculated first as follows.

$$\hat{C}^{i+1}=(\hat{Q}^{i+1},\hat{D}^{i+1})=(Q^i \otimes \bar{D}^p, \bar{D}^{p+1}),$$

$$Q^i \otimes \bar{D}^p=(p^i_0+\Delta \bar{p}^p_0, \Delta \bar{q}^p_0 q^i_0, \Delta \bar{q}^p_1 q^i_1, \ldots, \Delta \bar{q}^p_{NJ-1} q^i_{NJ-1})$$

After calculating $\hat{C}^{i+1}$, a position $Q^{i+1}$ of a subsequent state of a character may be obtained by assigning a weight to $\hat{Q}^{i+1}$ to mix it with $\hat{Q}^{p+1}$. In a similar way to one applied to obtain $Q^{i+1}$, a displacement $D^{i+1}$ of the subsequent state of the character may be obtained by assigning a weight to $\hat{D}^{i+1}$ and mixing it with $\bar{D}^{p+1}$. Such a process of determining a subsequent state of a current state in a reference motion may be iterated until $\bar{C}^p$ is included in a predefined motion.

The system may select a character state $\bar{C}^p$ from motion clips based on a first cost function including four terms.

$$\text{cost}=\alpha_r S_r(v,\bar{C}^j)+\alpha_b S_b(C^i,\bar{C}^j)+\alpha_b S_b(C^i,\bar{C}^j,B)+\alpha_\theta S_\theta(\bar{C}^j,\theta), \text{ where}$$

$\alpha_r$, $\alpha_d$, $\alpha_b$, and $\alpha_\theta$ denote weights for the corresponding terms. $S_r(v, \bar{C}^j)$ may indicate a cost for obtaining a target velocity v included in a motion specification. $S_d(C^i, \bar{C}^j)$ may indicate a cost for improving interdependency on each other of frames including successive character states included in a reference motion while satisfying the motion specification. $S_b(C^i, \bar{C}^j, B)$ may indicate a cost for inducting a character to control a ball at a desirable time and position. $S_\theta(\bar{C}^j, \theta)$ may indicate a cost for obtaining a target rotation angle $\theta$ included in the motion specification.

The first term $S_r(v, \bar{C}^j)$ may be defined as follows.

$$S_r(v, \bar{C}^j) = \sum_{l=0}^{N_s-1}\left(v - \frac{\|\Delta \bar{p}_0^{j+l}\|_{xy}}{h}\right)^2,$$

where
$\bar{C}^j$ denotes a character state in a frame j of a motion clip, $\Delta \bar{p}_0^{j+1}$ denotes a positional displacement of a root from the frame j to a frame j+1 of the motion clip. In addition, h denotes a time interval between two successive frames. $\|\Delta \bar{p}_0^{j+1}\|_{xy}$ may indicate a length of $\Delta \bar{p}_0^{j+1}$ projected to a floor surface. $\bar{C}^p$ to be selected by the term $S_r(v, \bar{C}^j)$ may indicate a character state $\bar{C}^p$ of a motion clip that minimizes a sum of squares of differences between the target velocity v and character root velocities, with respect to $N_s$ states from a state $\bar{C}^j$ to a state $\bar{C}^{j+N_s-1}$ of the motion clip.

The second term $S_d(C^i, \bar{C}^j)$ may be defined as follows.

$$S_d(C^i \cdot \bar{C}^j) = \sum_{l=1}^{N_d} d(C^{i-l} \cdot \bar{C}^{j-l}),$$

where
$\bar{C}^p$ to be selected by the cost term $S_d(C^i, \bar{C}^j)$ may indicate a character state $\bar{C}^p$ that minimizes a sum of $d(C^{i-1}, \bar{C}^{j-1})$ which is a motion distance between $C^{i-1}$ of a reference motion and $\bar{C}^{j-1}$ of a motion clip, with respect to $l=1, \ldots, N_d$, based on previous states of a current state $C^i$ of the reference motion, for example, $N_d$ previous states from a state $C^{i-1}$ to a state $C^{i-N_d}$. The motion distance $d(C^{i-1}, C^{j-1})$ may be a motion distance that is calculated by a known method.

The third term $S_b(C^i, \bar{C}^i, B)$ may be defined as follows.

$$S_b(C^i, \bar{C}^j, B) = \begin{cases} \left\|\bar{f}^{j+k} - (B^{i+k} - (\bar{p}_0^j + p_0^i))\right\|_{xy}^2 & \text{if } \bar{f}^{j+k} \text{ exists} \\ \epsilon & \text{otherwise} \end{cases},$$

where
$\bar{f}^{j+k} \in \mathbb{R}^3$ may indicate a position of a foot joint of a character that is included in a state $\bar{C}^{j+k}$ including a kick pose in a motion sub-clip starting from a state $\bar{C}^j$. $B^{i+k}$ may indicate a position of a ball corresponding to a frame i+k included in a trajectory B of the ball. $\Delta \bar{p}_0^j$ may indicate a displacement of a character root in a frame j with respect to $\bar{p}_0^0$ of a motion clip. $\bar{C}^p$ to be selected by the term $S_b(C^i, \bar{C}^j, B)$ may indicate $\bar{C}^p$ including a kick pose that is closest to the ball among a set $\bar{K}$ of kick poses included in motion clips. However, when a kick pose is not included in the motion clips, a small positive constant $\epsilon$ may be returned.

The fourth term $S_\theta(\bar{C}^j, \theta)$ may be defined as follows.

$$S_\theta(\bar{C}^j, \theta)=(\bar{\theta}^j-\theta)^2, \text{ where}$$

$\bar{\theta}^j$ denotes a rotation angle of a state $\bar{C}^j$ that is indicated in advance. $\bar{C}^p$ to be selected by the term $S_\theta(\bar{C}^j, \theta)$ may indicate $\bar{C}^p$ in which a rotation value of a character root projected to a floor surface is closest to a target rotation angle $\theta$.

According to the term $S_d(C^i, \bar{C}^j)$ in the first cost function, $N_d$ previous states of a current state $C^i$ from a state $C^{i-1}$ to a state $C^{i-N_d}$ may need to be considered, and thus the first cost function may be calculated when at least $N_d$ character states are included in a reference motion. However, the $N_d$ previous states of the current state $C^i$ are not present in a step in which the reference motion is initially generated, and thus the term $S_d(C^i, \bar{C}^j)$ in the first cost function may not be calculated. In such a case, based on whether a reference motion for which simulation is already completed in the system has been generated before, a method of setting the $N_d$ previous states $\{C^{1-i}|i=1, 2, \ldots, N_d\}$ of the current state $C^i$ may vary.

For example, when a reference motion for which simulation is already completed in the system has been generated before, character states included in a most recently generated reference motion may be used to generate a current reference motion. In this example, most recent $N_d$ states of a reference motion simulated immediately before may be set to be a previous state $\{C^{1-i}|i=1, 2, \ldots, N_d\}$ of the current reference motion. That is, the system may correspond to a feedback system in which a motion generated in a previous step is applied to a motion to be generated in a next step.

In contrast, when a reference motion for which simulation is already completed in the system has not been generated before, $N_d$ states included in a motion sub-clip may be set to be a previous state $\{C^{1-i}|i=1, 2, \ldots, N_d\}$ of a current reference motion. For this, the system may select $C^1_{init}$ that minimizes an initial cost $S_{init}$ from among all states $\bar{C}^j$ included in a motion clip corresponding to a motion type $t_0$ of an initial motion specification $U_0=(t_0, v_0, \theta_0)$. The initial cost $S_{init}$ may be represented as follows.

$$S_{init}(v_0, \bar{C}^j) = \sum_{l=0}^{N_s-1} \left(v_0 - \frac{\|\Delta \bar{p}_0^{j+l}\|_{xy}}{h}\right)^2$$

When $C^1_{init}$ that minimizes $S_{init}$ is determined, the system may select $N_d$ states starting from $C^1_{init}$ from a selected motion clip, and set the selected $N_d$ states to be a previous state $\{C^{1-i}|i=1, 2, \ldots, N_d\}$ of a current reference motion. Herein, $C^{1-N_d}=C^1_{init}$. A rotation value $q^{1-i}_0$ and a displacement $\Delta p^{1-i}_0$ of a character root in each state $C^{1-i}$ may be refined to be arranged in accordance with an initial position of a ball.

As described above, the motion predicting component 110 may generate a reference motion based on a first cost function. The generating of the reference motion based on the first cost function may include generating the reference motion such that the first cost function is minimized.

A reference motion $M=\{C^i|i=1, \ldots, N_p\}$ that is generated as described above may be a reference motion generated without considering a position of a ball and a kick pose of a character, and thus the reference motion may need to be refined based on the position of the ball and the kick pose of the character.

Figures 3A, 3B, 3C:
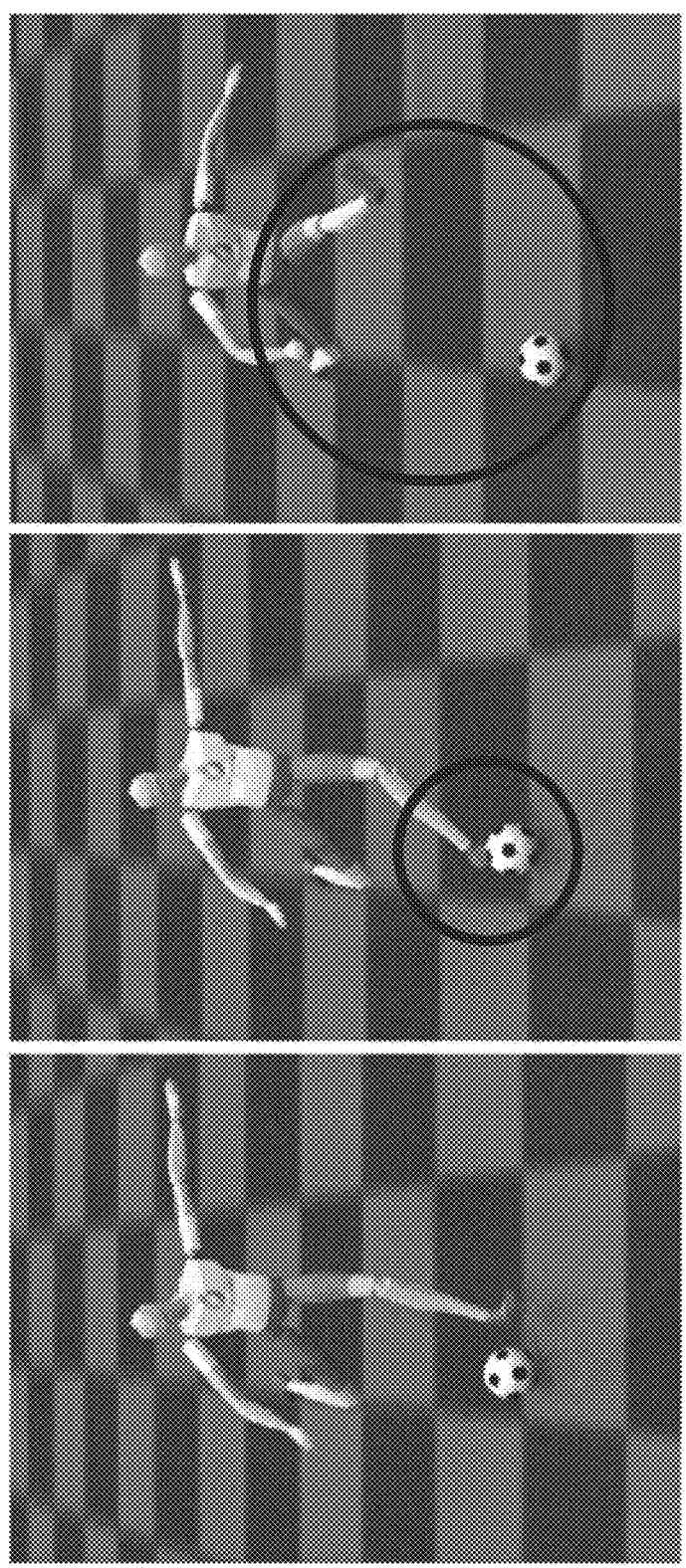
FIGS. 3A through 3C illustrate examples of results of simulating a trajectory of a ball and a state of a character in a kick frame according to an example embodiment.

For example, referring to FIGS. 3A through 3C, a result of simulating a reference motion refined based on a position of a ball and a kick pose of a character in a kick frame may be obtained as illustrated in FIG. 3A. However, when the position of the ball is not considered, positions of foot joints included in the kick pose may not be accurately arranged in accordance with the position of the ball as illustrated in FIG. 3B. In addition, when the kick pose is not considered, a position of a foot joint of the other foot of a swing foot may be arranged inaccurately as illustrated in FIG. 3C.

Thus, the motion predicting component 110 may adjust a character state included in a reference motion to be suitable for a position of a ball and a kick pose through the motion refining operation 112. The motion refining operation 112 may include changing positions of joints included in a character to be suitable for the position of the ball and the kick pose by changing a reference motion M. The joints included in the character of which the respective positions are to be changed based on the position of the ball may include a kick foot.

The motion refining operation 112 may include defining two displacement vectors $v_0$ and $v_1$ respectively for a position $f_k$ of a kick foot included in a character state $C^\kappa$ corresponding to a kick frame $\kappa$ from a root position $p^1_0$ included in a character state $C^1$ corresponding to a first frame, and for a position $B^\kappa$ of a ball corresponding to the kick frame $\kappa$ from the root position $p^1_0$.

$$v_0 = f_\kappa - p^1_0,$$

$$v_1 = B^\kappa - p^1_0$$

The motion refining operation 112 may then include deriving, from the two displacement vectors $v_0$ and $v_1$, a scaling factor $\eta \in R$ and a rotation vector $\theta_r \in R^3$ that are used to change a reference motion such that a position of a kick foot matches a position of a ball. Herein, $\eta$ and $\theta_r$ may be represented as follows.

$$\eta = \frac{\|(v_1)_{xy}\|}{\|(v_0)_{xy}\|},$$

$\theta_r = \cos^{-1}((\hat{v}_0)_{xy} \cdot (\hat{v}_1)_{xy})(\hat{v}_0)_{xy} \times (\hat{v}_1)_{xy})$, where a symbol ^ indicates normalization of a corresponding vector.

The motion refining operation 112 may then include converting a positional displacement $\Delta p^i_0$ between and a position $p^i_0$ of a root and a position of the root in each frame, and a rotation value displacement $\Delta q^i_0$, using $\eta$ and $\theta_r$ for each frame $i=1, 2, \ldots, N_p$, as represented below.

$$(p^i_0)'_{xy} = \begin{cases} (p^i_0)_{xy} & \text{if } i = 1 \\ (p^{i-1}_0)'_{xy} + \eta E(\theta_r)(\Delta p^{i-1}_0)_{xy} & \text{otherwise} \end{cases},$$

$$(\Delta p^i_0)'_{xy} = \eta E(\theta_r)(\Delta p^i_0)_{xy},$$

$$(\Delta q^i_0)' = \exp(\theta_r) q^i_0.$$

where $E(\theta_r)$ indicates a function that maps a rotation vector $\theta_r$ to a corresponding rotation matrix, and $\exp(\theta_r)$ indicates a function that maps the rotation vector $\theta_r$ to a corresponding quaternion.

In general, a motion of a character obtained by simulating a reference motion may not exactly match the reference motion due to fine and complex motion dynamics required to control a ball. As the simulation progresses, a current state of the character may tend to deviate from a corresponding state of a reference motion M, which may negatively affect the stability of motion control. The system may reduce such a deviation for each window through the simulation-based motion changing operation 121. The simulation-based motion changing operation 121 that changes a motion to be suitable for simulation may include optimizing a motion.

Figure 4:
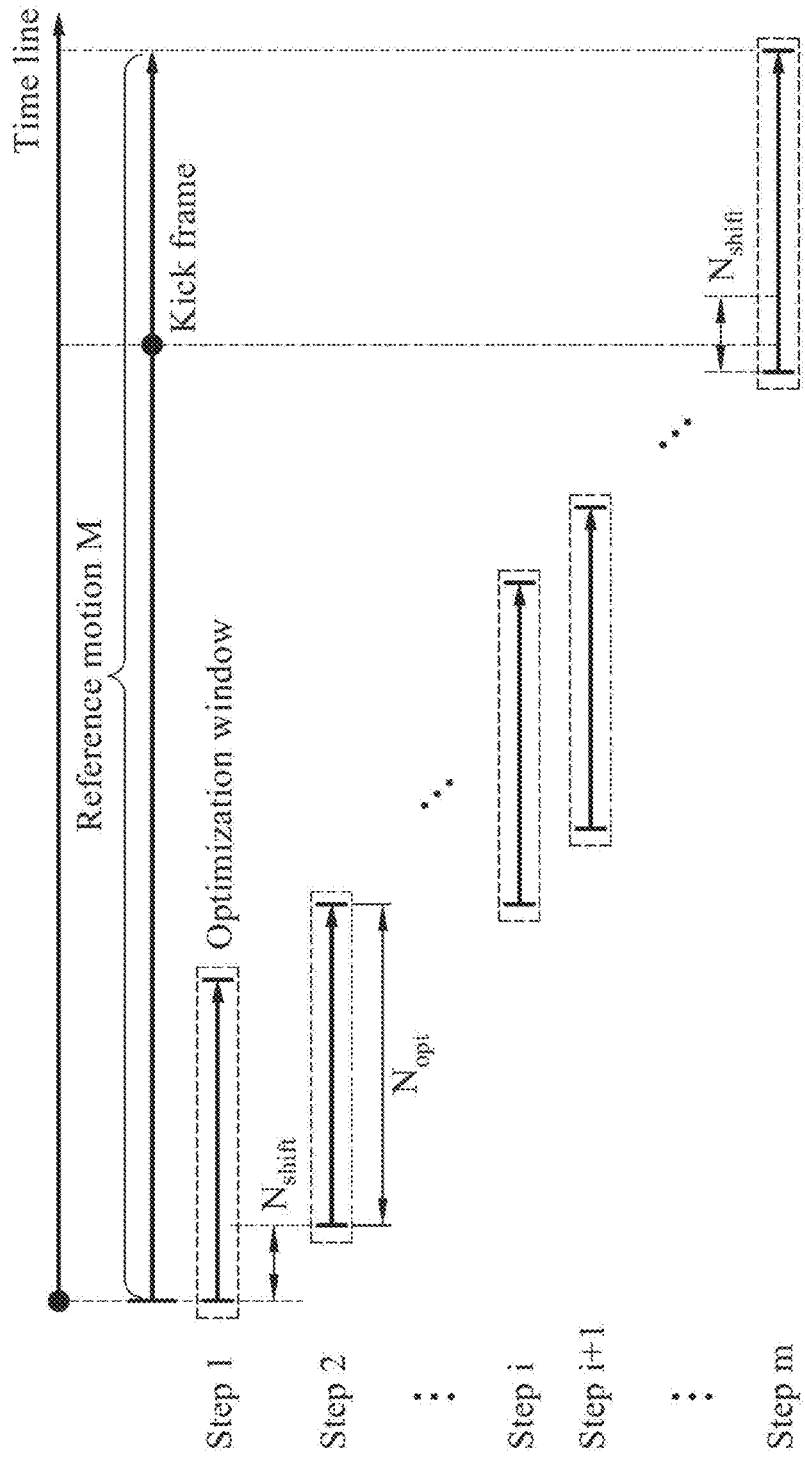
FIG. 4 illustrates an example of a process of dividing a reference motion into windows by a certain frame size and moving them iteratively according to an example embodiment.

For example, referring to FIG. 4, the system may change a remaining portion of a reference motion M such that a position of a root of a character in an initial state matches a position of the root in a current state, while moving a window in the reference motion M. Subsequently, the system may arrange a kick foot in a kick frame included in the reference motion M based on a position of a ball. The kick frame may correspond to a first frame of a last window included in the reference motion M. For example, the system may divide the reference motion M into optimization windows of a size including $N_{opt}$ frames, and generate a feedback control vector while moving a window iteratively m times at intervals of $N_{shift}$ frames and solving an optimal control problem in each window. In this example, a feedback control vector generated in a window in a time step i may generate a simulated motion corresponding to the window in the time step i, and the generated simulated motion corresponding to the window in the time step i may be used to generate a simulated motion corresponding to a window in a time step i+1.

The system may define a system dynamic model that handles a motion of a character and a motion of a ball and dynamics of each of the motions, and a physical interaction therebetween. The system may first define a state vector $x^i$ and a control vector $u^i$ corresponding to a window in each time step i included in the system dynamic model.

$$x^i=[(Q^i_c)^\top (Q^i_b)^\top (°Q^i_c)^\top (°Q^i_b)^\top]^\top,$$

$$u^i=\tau^i, \text{ where}$$

$Q^i_c \in R^{nc}$ indicates a pose of a character having an ne degree of freedom (DoF), and $Q^i_b \in R^6$ indicates a position and a rotation value of a second object having 6DoF. In addition, $°Q^i_c$ and $°Q^i_b$ indicate a derived function based on a time $Q^i_c$ and a time $Q^i_b$, respectively. For efficiency of calculation, it may be possible to reduce a DoF of a state vector by representing a movement of joints, excluding some joints (e.g., shoulder joint) based on a Euler angle.

In addition, $\tau^i \in R^{nc-6}$ indicates joint torques of a character, excluding a root, in a window of a time step i. The joint torques of the character may correspond to rotation forces determined based on rotation values and rotation value displacements of the joints included in the character. As described above, rotation values $q^i_j$ of joints included in a character state of the character may correspond to angles formed between bones connected through the joints, and the joint torques may be determined based on rotation value displacements of the joints included in the character.

In the system dynamic model, a state vector $x^{i+1}$ corresponding to a window of a subsequent time step i+1 of a current time step i may be represented as follows based on a size h of a time step when performing an integration and on a semi-implicit Euler method.

$$x^{i+1}=g(x^i,u^i)=[(Q^i_c+h°Q^{i+1}_c)(°Q^i_b+h°Q^{i+1}_b)(°Q^{i+1}_c) (°Q^{i+1}_b)]$$

In a subsequent time step, a joint velocity $°Q^{i+1}_c$ of a character and a velocity $°Q^{i+1}_b$ of a ball may be derived as follows by combining dynamics of the character and the ball with a physical interaction therebetween.

$$\begin{bmatrix} \dot{Q}^{i+1}_c \\ \dot{Q}^{i+1}_b \end{bmatrix} = \begin{bmatrix} \dot{Q}^i_c \\ \dot{Q}^i_b \end{bmatrix} + hM^{-1}\left(\begin{bmatrix} \tau^i_c \\ 0_{6\times 1} \end{bmatrix} - \begin{bmatrix} e(Q^i_c, \dot{Q}^i_c, f^e_c) \\ e(Q^i_b, \dot{Q}^i_b, f^e_b) \end{bmatrix} - k_d \begin{bmatrix} \dot{Q}^i_c \\ \dot{Q}^i_b \end{bmatrix}\right) +$$

$$M^{-1}\begin{bmatrix} J(Q^i_c)^\top \\ J(Q^i_b)^\top \end{bmatrix} f^i_{ct}, \text{ where } M = \begin{bmatrix} M(Q^i_c) & 0_{n_c \times 6} \\ 0_{6 \times n_c} & M(Q^i_b) \end{bmatrix},$$

where $\tau^i_c=[0_{1\times 6} \ (\tau_i)^T]^T \in R^{nc}$. $M(\cdot)$ may indicate a total mass matrix, and $e(\cdot)$ may indicate a bias force. The mass matrix $M(\cdot)$ may be a mass matrix obtained by converting a general mass matrix based on an armature inertial and damping to improve the stability of a numerical integration of dynamics. The bias force $e(\cdot)$ may correspond to torques generated by an external force $f^e_c$ applied to the character and an external force $f^e_b$ applied to the ball in addition to gravity, a Coriolis force, and a centrifugal force. $k_d$ denotes a damping gain, and $J(\cdot)$ indicates a kinematic Jacobian matrix of a contact point on which a contact impulse $f^i_{ct}$ acts.

The motion simulating component 120 may optimize a motion of a character and a motion of a ball and simulate them such that the character moves according to a reference motion M while interacting with the motion of the ball, based on a current state vector $x^i$ and the reference motion M. For example, based on the system dynamic model, a series of control vectors $U=\{u^i|i=1, 2, \ldots, N_{opt}-1\}$ may be derived as follows by formulating a finite-horizon optimization control problem in a window including $N_{opt}$ frames.

$$\min_U \sum_{i=1}^{N_{opt}-1} c(x^i, u^i) + c^f(x^{N_{opt}}),$$

subject to $x^1=x, x^{i+1}=g(x^i,u^i)$ for $i=1, 2, \ldots, N_{opt}-1,$ $\gamma_j(x^i) \leq 0$ for $i=1, 2, \ldots, N_{opt}, j=1, 2, \ldots, L$, where $c(x^i, u^i)$ and $c^f(x^{N_{opt}})$ indicate a second cost function in a time step i ($i=1, 2, \ldots, N_{opt-1}$) and a last time step $N_{opt}$, respectively. Two equations $x^1=x$ and $x^{i+1}=g(x^i, u^i)$ may be an equation that limits the system dynamic model that derives a state vector $x^i+1$ in a subsequent time step i+1 from a state vector $x^i$ in a current time step i. $\gamma_j(x^i)$ may indicate a jth inequality constraint in a time step i, in which $j=1, 2, \ldots, L$ (L denotes the number of inequality constraints).

When $\bar{X}_c=\{(\bar{Q}^i_c, \bar{\nabla}Q^i_c)|i=1, 2, \ldots, N_{opt}\}$ is defined as a target trajectory of a character in a window that is extracted from a reference motion M, each second cost function $c(x^i, u^i)$ in a time step i ($i=1, 2, \ldots, N_{opt}-1$) may be represented as follows.

$$c(x^i,u^i)=c^{ref}(x^i,u^i)+c^{fpos}(x^i)+c^{ball}(x^i)$$

A term $c^{ref}(x^i \ u^i)$ included in a second cost function may indicate a cost for tracking a target trajectory $\bar{X}_c$ of a character, and be represented as follows.

$$c^{ref}(x^i, u^i) = \frac{w_1}{2}\|\bar{Q}^i_c - Q^i_c\|^2 + \frac{w_2}{2}\|\bar{\dot{Q}}^i_c - \dot{Q}^i_c\|^2 + \frac{w_3}{2}\|\bar{r}^i - r^i\|^2 + \frac{w_4}{2}\|\tau^i\|^2,$$

where $r^i \in R^3$ indicates a displacement vector from a root to a head joint in a time step i, and $\bar{r}^i$ denotes a target vector calculated from $\bar{Q}^i_c$. A first term of $c^{ref}(x^i, u^i)$ may indicate a cost for tracking a target pose of the character, a second term of $c^{ref}(x^i, u^i)$ may indicate a cost for maintaining a joint velocity to be close to a target velocity, a third term of $c^{ref}(x^i, u^i)$ may indicate a cost for maintaining a rotation value of an upper body joint to be close to a target rotation value of the upper body joint, and a fourth term of $c^{ref}(x^i, u^i)$ may indicate an energy consumption cost. In addition, $w_i(i=1, 2, 3, 4)$ denotes a weight of each term.

$c^{fpos}(x^i)$ may indicate a cost for tracking a target position of a kick foot, and be represented as follows.

$$c^{f \, pos}(x^i) = \frac{w_5}{2}\left\|\begin{bmatrix} \bar{p}^i_{lf} \\ \bar{p}^i_{rf} \end{bmatrix} - \begin{bmatrix} p^i_{lf} \\ p^i_{rf} \end{bmatrix}\right\|^2,$$

where $p^i_{lf}$ and $p^i_{rf}$ may respectively indicate a position of a left foot joint and a position of a right foot joint in a time step i. In addition, $\bar{p}^i_{lf}$ and $\bar{p}^i_{rf}$ may indicate a target position of the left foot joint and a target position of the right foot joint, respectively. $w_5$ denotes a weight. Thus, $c^{fpos}(x^i)$ may be a cost for a character to kick a ball with a swing foot in a timely manner and place a support foot of the character at a correct position.

Figure 6:
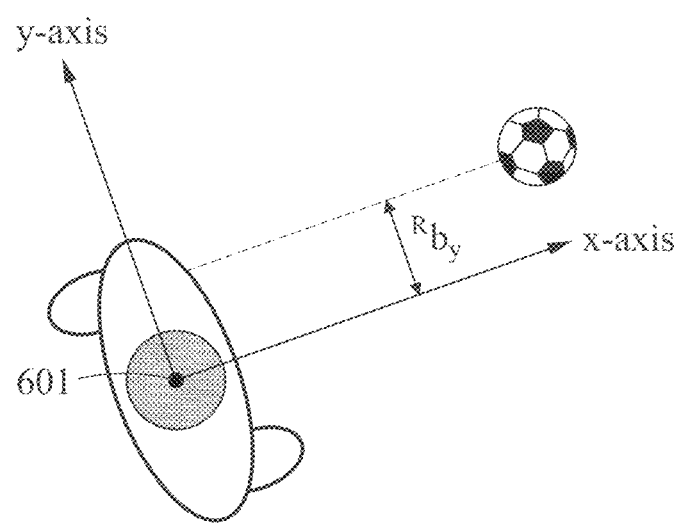
FIG. 6 illustrates an example of a root coordinate system R and a position of a ball according to an example embodiment.

$c^{ball}(x^i)$ may indicate a cost for controlling a ball, and be represented as follows.

$$c^{ball}(x^i) = \frac{w_6}{2}({}^R b^i_y)^2 + \frac{w_7}{2}\left\|{}^\nabla b^i - b^i\right\|^2,$$

where ${}^R b^i_y \in R$ indicates a position of a ball on a y axis in a root coordinate system R in a time step i. For example, referring to FIG. 6, the root coordinate system R may indicate a position ${}^R b_y$ of the ball on the y axis in the root coordinate system R having a root position 601 as a starting point. In addition, $°b^i$ indicates a time-based derived function of a position $b^i \in R^3$ of the ball in the time step i, and ${}^\nabla b^i$ indicates a target velocity of the ball in the time step i. $w_6$ and $w_7$ denote weights.

A first term of $c^{ball}(x^i)$ may indicate a cost for adjusting a position of a character such that a ball is arranged in front of the character, and be activated only when a character motion of the character corresponds to forward dribbling. A second term of $c^{ball}(x^i)$ may indicate a cost for the character to kick the ball at the target velocity of the ball, and be activated in frames close to a kick frame because a speed of the ball is controlled by a motion of the character kicking the ball.

Under an inequality constraint $\gamma_j(x^i) \leq 0$ (j=1, 2, ..., L) based on each time step i (i=1, 2, ..., $N_{opt}$) that a shape of a foot of the character is a cuboid shape, it may be activated in the frames close to the kick frame as a cost for arranging the ball to be kicked from a front side of a swing foot at a right time.

Figure 7A:
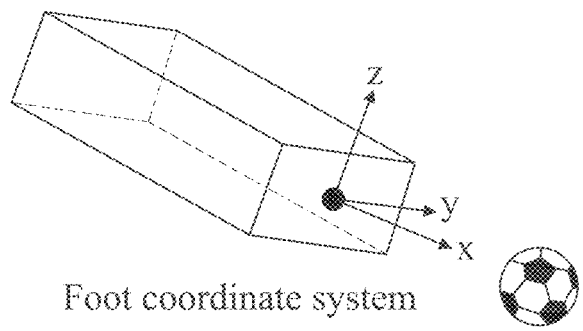
FIGS. 7A through 7C illustrate an example of a kick foot coordinate system F and a position of a ball according to an example embodiment.
Figure 7B:
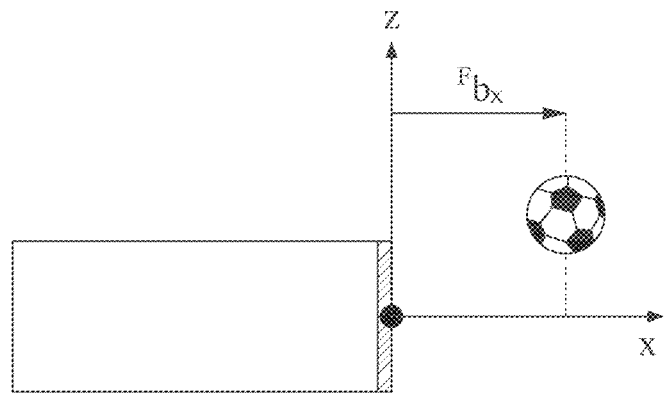
Figure 7C:
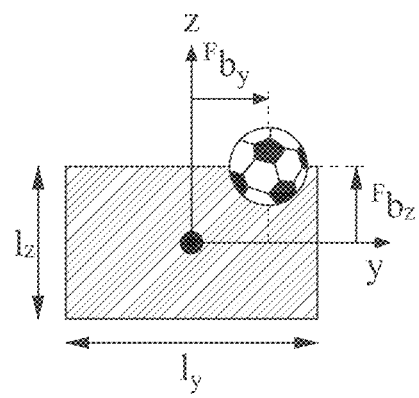

${}^F b^i$ may indicate a position of the ball in a kick foot coordinate system F in a time step i. Referring to FIG. 7A, the kick foot coordinate system F may be a three-dimensional (3D) coordinate system having a position of a kick foot as a starting point. The position ${}^F b^i$ of the ball may be indicated by an x-axis coordinate, a y-axis coordinate, and a z-axis coordinate (${}^F b^i_x, {}^F b^i_y, {}^F b^i_z$) in the kick foot coordinate system F. In detail, referring to FIG. 7B illustrating a side view (in a x-z plane direction), the x-axis coordinate of the ball in the kick foot coordinate system F may be determined to be ${}^F b_x$. In addition, referring to FIG. 7C illustrating a front view (in a y-z plane direction), the y-axis coordinate and the z-axis coordinate of the ball in the kick foot coordinate system F may be determined to be ${}^F b_y$ and ${}^F b_z$, respectively. In the system dynamic model, by the following two inequality constraints, it may be set such that a front side of a foot kicks a ball in an x-axis direction.

$$-{}^F b^i_x \leq 0, {}^F b^i_x - r_b \leq 0, \text{ where}$$

$r_b$ denotes a radius of the ball.

In addition, by the following four inequality constraints, it may be set such that a position of a ball projected to a y-z plane of a local coordinate system is arranged to be in front of a kick foot.

$$-\frac{1}{2}l_y - {}^F b^i_y \leq 0, \quad {}^F b^i_y - \frac{1}{2}l_y \leq 0,$$

$$-\frac{1}{2}l_z - {}^F b^i_z \leq 0, \quad {}^F b^i_z - \frac{1}{2}l_z \leq 0.$$

Referring to FIG. 7C, $l_y$ and $l_z$ may respectively indicate a width and a height of a front side. The system dynamic model may allow a portion of a kick foot to get to a ball for more natural contact between colliding bodies.

The system may use an iterative linear quadratic Gaussian (iLQG) algorithm without constraints to solve an optimization control problem, and thus require a process of converting the constraints to a cost condition. For this, a smooth-max (hereinafter simply smax) function and a smooth-min (hereinafter simply smin) function that have a threshold value $\alpha$ may be defined as represented below.

$$\text{smax}(x; \alpha, \beta) = \frac{1}{2}\left(\sqrt{(x-\alpha)^2 + \beta^2} + (x-\alpha)\right),$$

$$\text{smin}(x; \alpha, \beta) = \frac{1}{2}\left(\sqrt{(x-\alpha)^2 + \beta^2} - (x-\alpha)\right).$$

A first function may return a value close to $(x-\alpha)$ when $x>\alpha$, and a value close to 0 otherwise. A second function may return a value close to $(\alpha-x)$ when $x<\alpha$, and a value close to 0 otherwise. $\beta$ denotes a smoothing coefficient that adjusts the closeness of a function to 0 when $x=\alpha$. Using the smax (·) and smin (·) functions, an inequality constraint may be converted to a third cost function including the following three terms.

$$c^{kick}(x^i) = w_8(c_x^{kick}(x^i) + c_y^{kick}(x^i) + c_z^{kick}(x^i)), \text{ where}$$

$w_8$ denotes a weight constant, and each term in $c^{kick}(x^i)$ may be defined as follows.

$$c_x^{kick}(x^i) = \text{smin}({}^F b^i_x; 0, \beta) + \text{smax}({}^F b^i_x; r_b, \beta),$$

$$c_y^{kick}(x^i) = \text{smin}\left({}^F b^i_y; -\frac{1}{2}l_y, \beta\right) + \text{smax}\left({}^F b^i_y; \frac{1}{2}l_y, \beta\right),$$

$$c_z^{kick}(x^i) = \text{smin}\left({}^F b^i_z; -\frac{1}{2}l_z, \beta\right) + \text{smax}\left({}^F b^i_z; \frac{1}{2}l_z, \beta\right).$$

Since a control vector $u^{Nopt}$ is not required in a last time step $N_{opt}$, and thus $c^f(x^{Nopt})$ of the third cost function may be the same as $c(x^i, u^i)$ in another time step i, except that it does not have a fourth term $$\frac{w_4}{2}\|\tau^{Nopt}\|^2 \text{ in } c^{ref}(x^i, u^i).$$

When a current state vector $x^i$ and a reference motion M are given, the optimization control problem of the system dynamic model may be solved by the iLQG algorithm that is a modification to a differential dynamic programming (DDP) algorithm. The iLQG algorithm may be substantially faster than the DDP algorithm because it does not use a dichotomy function of the system dynamic model. The iLQG algorithm applied to the system dynamic model may generate an optimal control policy to obtain an optimal feedback control vector for controlling a soccer motion. Thus, the generated optimal control policy may include an optimal control vector $\{u^{*i}|i=1, 2, ..., N_{opt}-1\}$, an optimal state vector $\{x^{*i}|i=1, 2, ..., N_{opt}\}$, and an optimal feedback gain matrix $\{K^{*i}|i=1, 2, ..., N_{opt}-1\}$. The system may calculate an optimal feedback control vector $u^{*i}_{fb}$ in each frame i of a window based on the optimal control policy as represented below.

$$u^{*i}_{fb} = u^{*i} + K^{*i}(x^i - x^{*i})$$

A second term may indicate a term for compensating for a deviation between a current state and an optimal state vector. The motion simulating operation 122 may include updating a current state $x^i$ based on a feedback control vector $u^{*i}_{fb}$ indicating feedback torques of joints of a character and on an external force when there is the external force. The system may perform simulation for each window while moving windows until a state simulated with a great external force applied to the character deviates greatly from a corresponding state of a reference motion or a generated reference motion is all used up.

Figure 8A:
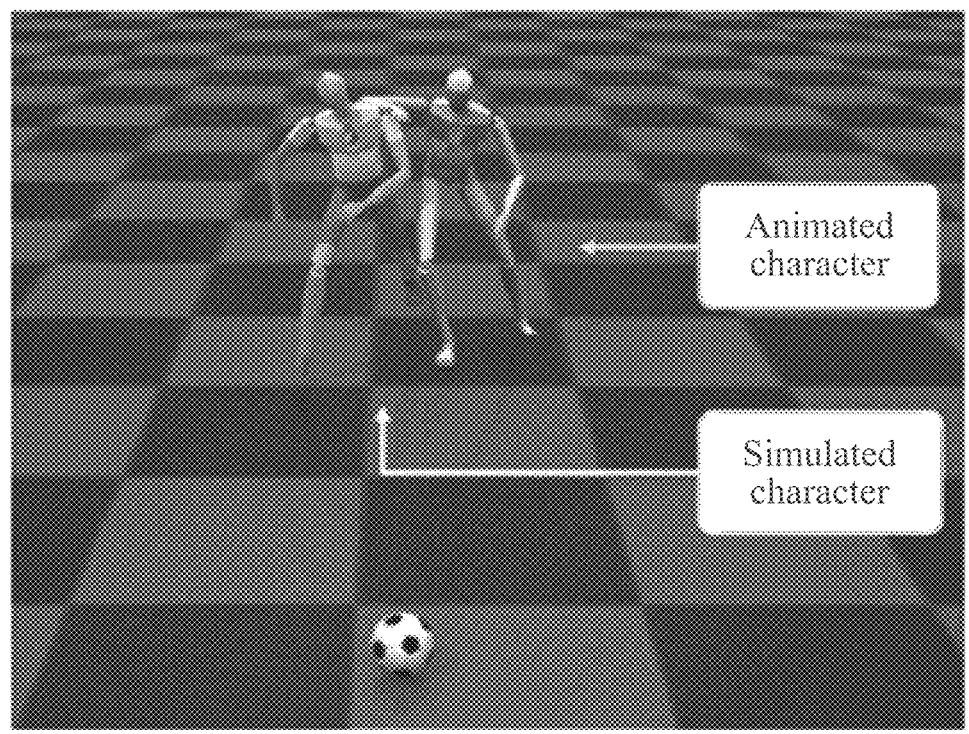
FIGS. 8A and 8B illustrate an example of when a great external force is applied to a character performing a soccer motion according to an example embodiment.
Figure 8B:
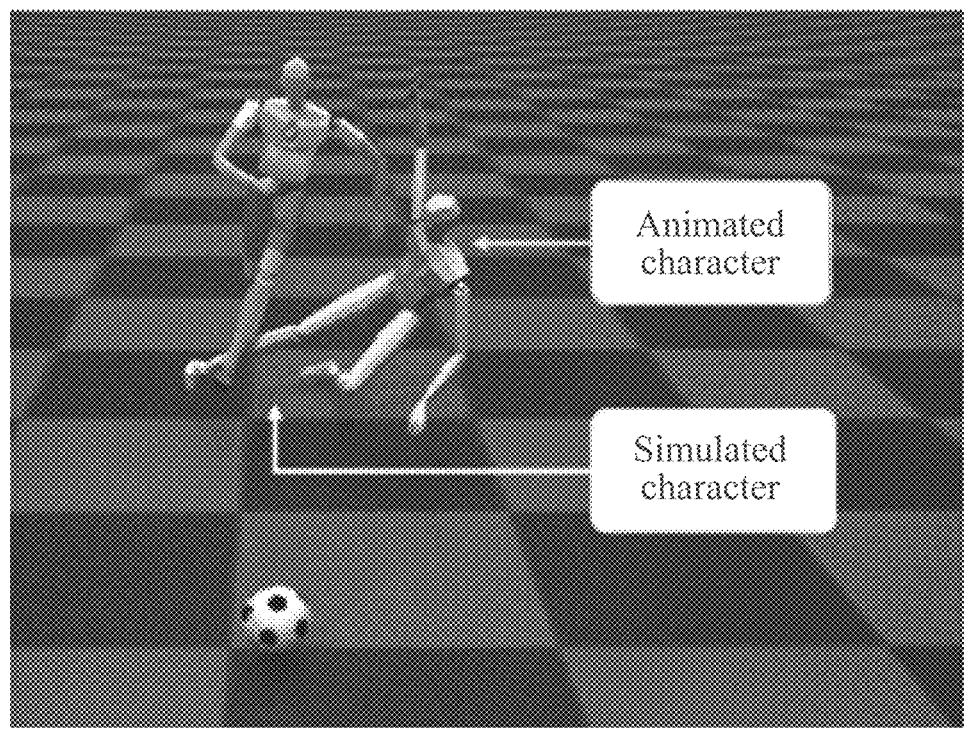

Referring to FIGS. 8A and 8B, a great external force may be applied to a character performing a soccer motion when the character is pushed or tackled by another character.

For example, when a state simulated by applying the external force to the character deviates greatly from a corresponding state of a reference motion or a generated reference motion is all used up, the system described herein may generate a new reference motion by activating a feedback control loop based on $N_d$ character states of a most recently simulated motion of the character.

Figure 9:
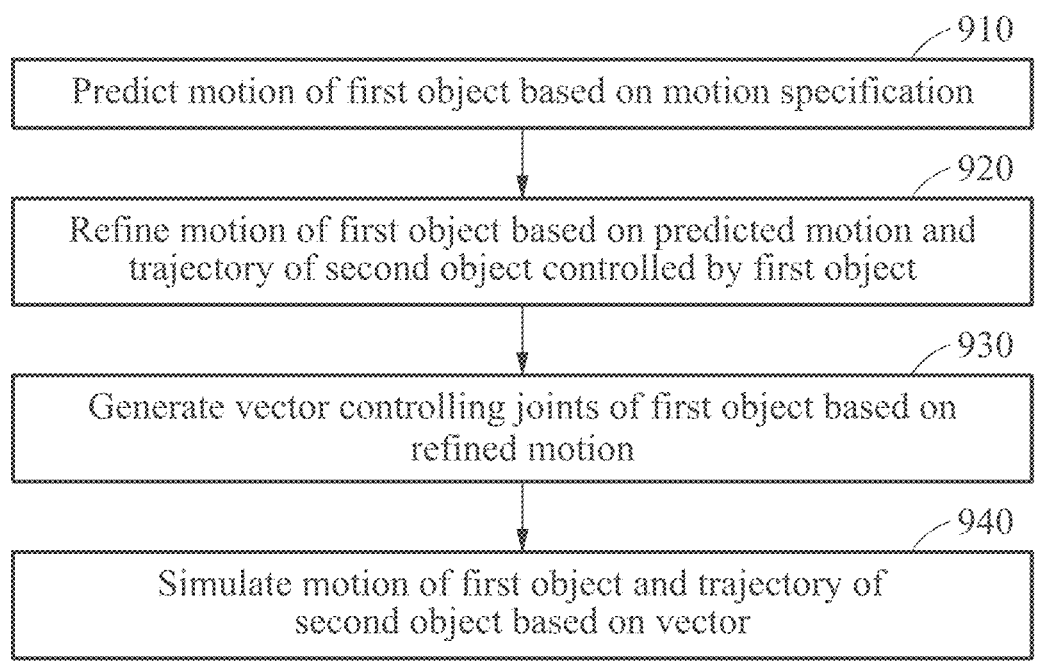
FIG. 9 illustrates an example of a flowchart of a motion generating method according to an example embodiment.

FIG. 9 illustrates an example of a flowchart of a motion generating method according to an example embodiment. Referring to FIG. 9, a motion generating method includes operation 910 of predicting a motion of a first object based on a motion specification, operation 920 of refining the motion of the first object based on the predicted motion and a trajectory of a second object controlled by the first object, operation 930 of generating a vector for controlling joints of the first object based on the refined motion, and operation 940 of simulating the motion of the first object and the trajectory of the second object based on the generated vector.

The motion of the first object predicted in operation 910 may correspond to a reference motion described above. The motion of the first object may include a plurality of states of the first object corresponding to a plurality of frames, and at least one of the frames may be a kick frame corresponding to a state of the first object taking a kick pose. Each of the states included in the motion of the first object may include positions of the joints of the first object corresponding to each of the frames, rotation values of the joints, displacements of the positions, and displacements of the rotation values. As described above, a state of the first object corresponding to a frame i may be represented as $C^i=(Q^i, D^i)$.

The motion specification may include a motion type, a motion velocity, and a motion angle. The motion type may correspond to a motion type t described above. The motion velocity may correspond to a target velocity v described above, and the motion angle may correspond to a target angle θ described above. The first object may include a human being who plays soccer or a character performing soccer, and the second object may include a ball. In this case, the motion type may include forward dribbling, side dribbling, and shooting.

Operation 910 of predicting the motion of the first object may include predicting a motion of the first object in a current iteration based on an example motion corresponding to the motion specification among example motions stored in a DB. The example motions may correspond to motion clips described above, and the example motion corresponding to the motion specification may correspond to a motion clip included in a motion group corresponding to the motion type included in the motion specification. The motion of the first object predicted in the current iteration may correspond to a reference motion generated in a current time step i as described above.

Operation 910 of predicting the motion of the first object may include selecting a first reference state from among a plurality of reference states included in the example motion based on a first cost function based on the motion specification and a first state of the first object, and determining a subsequent state of the first state based on whether the selected first reference state is included in a predefined kick motion. When the first reference state is included in the predefined motion, the determining of the subsequent state of the first state may include determining, to be the subsequent state of the first state, a subsequent state of the first reference state in the predefined kick motion. When the first reference state is not included in the predefined motion, the determining of the subsequent state of the first state may include determining the subsequent state of the first state based on the first state, the first reference state, and the subsequent state of the first reference state. The first reference state may correspond to a character state $C^p$ selected from a motion clip based on the first cost function including four terms described above.

Operation 910 of predicting the motion of the first object may include predicting a motion of the first object in a current iteration based on a motion of the first object simulated in a previous iteration. That is, operation 910 may include generating a current reference motion based on a reference motion of the first object with which simulation is already completed, in addition to generating the reference motion of the first object based on a motion clip stored in the DB and the motion specification.

Operation 920 of refining the motion of the first object may include refining a state of the first object in the kick frame corresponding to a state of the first object taking the kick pose based on a position of the second object in the kick frame. For example, in a case in which the first object is a character and the second object is a ball, operation 920 may correspond to an operation of refining a reference motion based on a position of the ball and a kick pose of the character.

Operation 930 of generating the vector for controlling the joints of the first object may include generating a plurality of windows based on a plurality of states included in the refined motion, and generating a vector for each of the windows based on states of the first object included in a corresponding window and positions of the second object included in the corresponding window, for each of the windows. Herein, a window may correspond to a unit obtained by dividing a motion of the first object including a plurality of frames by a size including a preset number of frames. The vector for controlling the joints of the first object may correspond to a feedback control vector described above.

Operation 930 of generating the vector for controlling the joints of the first object may include generating a control policy based on a second cost function based on the refined motion of the first object and the trajectory of the second object, and on a constraint associated with the joints of the first object, in a dynamic system including the first object and the second object, and generating the vector based on the generated control policy. The dynamic system may correspond to a system dynamic model described above. The trajectory of the second object may include a trajectory of the second object simulated in a previous iteration. The constraint may include an inequality constraint described above.

The control policy may include a target state vector corresponding to the motion of the first object and the trajectory of the second object, a target control vector corresponding to joint torques of the first object, and a target feedback gain indicating a ratio between the target state vector and the target control vector. The target state vector may include an optimal state vector described above, the target control vector may include an optimal control vector described above, and the target feedback gain may include an optical feedback gain matrix described above.

The generating of the control policy may include determining the control policy such that the second cost function is less than a preset threshold value while satisfying the constraint. For example, the generating of the control policy may include determining the control policy such that the second cost function is minimized. In this example, the target state vector included in the control policy may correspond to the optimal state vector, the target control vector may correspond to the optical control vector, and the target feedback gain may correspond to the optimal feedback gain matrix.

Operation 940 of simulating the motion of the first object and the trajectory of the second object may include simulating the motion of the first object and the trajectory of the second object based on the vector generated in operation 930 and an external force. The motion of the first object and the trajectory of the second object that are simulated in operation 940 may be used to perform operation 910 of predicting a motion of the first object in a next iteration.

The example embodiments described herein may be applied to various applications that simulate a motion of a first object (e.g., avatar, character, user, robot, and others) and a trajectory of a second object (e.g., ball, tool, and others) controlled by the first object. For example, the example embodiments may be applied to control a robot. In this example, a signal that controls the robot may be generated based on a motion of the first object. For another example, the example embodiments may be applied to a game engine. In this example, objects in a game may be represented or modeled based on a motion of the first object and/or a trajectory of the second object.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a motion of an object, comprising:
   predicting a motion of a first object based on a motion specification and a first cost function based on a first state of the first object, wherein predicting the motion of the first object based on the motion specification and the first cost function based on the first state of the first object comprises:
   determining a motion group including motion clips to use to predict the motion based on a motion type included in the motion specification;
   selecting a character state from the motion clips that minimizes the first cost function; and
   predicting the motion of the first object based on the selected character state;

refining a motion of the first object based on the predicted motion and a trajectory of a second object controlled by the first object;
generating a control policy based on the refined motion of the first object and a second cost function based on the trajectory of the second object;
generating a vector controlling joints of the first object based on the control policy;
simulating a motion of the first object and the trajectory of the second object based on the generated vector; and
generating a signal to control the motion of a robot based on the simulated motion of the first object.

2. The method of claim 1, wherein the predicting of the motion of the first object comprises:
predicting a motion of the first object in a current iteration based on a motion of the first object simulated in a previous iteration.

3. The method of claim 1, wherein the trajectory of the second object includes a trajectory of the second object simulated in a previous iteration.

4. The method of claim 1, wherein the generating of the vector comprises:
generating a plurality of windows based on a plurality of states included in the refined motion; and
generating a vector for each of the windows based on states of the first object included in a corresponding window and positions of the second object included in the corresponding window.

5. The method of claim 1, wherein the predicting of the motion of the first object comprises:
predicting a motion of the first object in a current iteration based on an example motion corresponding to the motion specification among example motions stored in advance in a database.

6. The method of claim 5, wherein the predicting of the motion of the first object in the current iteration comprises:
selecting a first reference state from among a plurality of reference states included in an example motion based on the first cost function based on the motion specification and the first state of the first object; and
determining a subsequent state of the first state based on whether the first reference state is included in a predefined kick motion.

7. The method of claim 6, wherein the determining of the subsequent state of the first state comprises:
when the first reference state is included in the predefined kick motion, determining a subsequent state of the first reference state in the predefined kick motion to be the subsequent state of the first state; and
when the first reference state is not included in the predefined kick motion, determining the subsequent state of the first state based on the first state, the first reference state, and the subsequent state of the first reference state.

8. The method of claim 1, wherein the refining of the motion of the first object comprises:
refining a state of the first object in a kick frame corresponding to a state of the first object in which a kick pose is taken, based on a position of the second object in the kick frame.

9. The method of claim 1, wherein the generating of the control policy comprises:
in a dynamic system including the first object and the second object, generating the control policy based on the second cost function based on the refined motion of the first object and the trajectory of the second object, and on a constraint associated with the joints of the first object; and
generating the vector based on the generated control policy.

10. The method of claim 9, wherein the generating of the control policy comprises:
determining the control policy such that the second cost function is less than a preset threshold value while satisfying the constraint,
wherein the control policy includes a target state vector corresponding to the motion of the first object and the trajectory of the second object, a target control vector corresponding to joint torques of the first object, and a target feedback gain indicating a ratio between the target state vector and the target control vector.

11. The method of claim 1, wherein the simulating comprises:
simulating the motion of the first object and the trajectory of the second object based on the vector and an external force.

12. The method of claim 1, wherein the motion of the first object includes a plurality of states of the first object corresponding to a plurality of frames,
wherein at least one of the frames is a kick frame corresponding to a state of the first object in which a kick pose is taken.

13. The method of claim 1, wherein each of states included in the motion of the first object includes positions of the joints of the first object corresponding to a corresponding frame, rotation values of the joints, displacements of the positions, and displacements of the rotation values.

14. The method of claim 1, wherein the motion specification includes a motion type, a motion velocity, and a motion angle.

15. The method of claim 14, wherein the first object includes a human being playing soccer, the second object includes a soccer ball, and the motion type includes forward dribbling, side dribbling, and shooting.

16. A non-transitory computer-readable storage medium storing instructions that, when executed by a processor, cause the processor to perform the method of claim 1.

17. An apparatus for generating a motion of an object, comprising:
at least one processor configured to:
predict a motion of a first object based on a motion specification and a first cost function based on a state of the first object, wherein predicting the motion of the first object based on the motion specification and the first cost function based on the state of the first object comprises:
determining a motion group including motion clips to use to predict the motion based on a motion type included in the motion specification;
selecting a character state from the motion clips that minimizes the first cost function; and
predicting the motion of the first object based on the selected character state;
refine a motion of the first object based on the predicted motion of the first object and a trajectory of a second object controlled by the first object;
generate a control policy based on the refined motion of the first object and a second cost function based on the trajectory of the second object;

simulate a motion of the first object and the trajectory of the second object based on a vector controlling joints of the first object based on the control policy; and generate a signal to control the motion of a robot based on the simulated motion of the first object.

18. The apparatus of claim 17, wherein the processor is configured to predict a motion of the first object in a current iteration based on a motion of the first object simulated in a previous iteration.

19. The apparatus of claim 17, wherein the trajectory of the second object includes a trajectory of the second object simulated in a previous iteration.

20. The apparatus of claim 17, wherein the processor is configured to generate a plurality of windows based on a plurality of states included in the refined motion, and generate a vector for each of the windows based on states of the first object included in a corresponding window and positions of the second object included in the corresponding window.

* * * * *